(12) United States Patent
Wen et al.

(10) Patent No.: US 7,837,335 B2
(45) Date of Patent: Nov. 23, 2010

(54) PROJECTOR

(75) Inventors: Wen-Fu Wen, Taipei Hsien (TW); Kai Huang, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 506 days.

(21) Appl. No.: 12/045,154

(22) Filed: Mar. 10, 2008

(65) Prior Publication Data

US 2009/0109406 A1 Apr. 30, 2009

(30) Foreign Application Priority Data

Oct. 26, 2007 (CN) .......................... 200710202288

(51) Int. Cl.
  *G03B 21/18* (2006.01)
  *G03B 21/16* (2006.01)
  *G03B 21/14* (2006.01)
  *G03B 21/22* (2006.01)
  *F24F 7/00* (2006.01)
  *F24F 13/14* (2006.01)
  *F21V 29/00* (2006.01)

(52) U.S. Cl. ........................... 353/61; 353/60; 353/119; 454/278; 454/313; 362/373

(58) Field of Classification Search .................... 353/61, 353/52, 57, 60, 119; 454/278, 313; 362/373
See application file for complete search history.

(56) References Cited

U.S. PATENT DOCUMENTS

| 3,019,701 | A | * | 2/1962 | Brueckner et al. | ............ 353/61 |
| 5,839,953 | A | * | 11/1998 | Kotoh et al. | ................ 454/313 |
| 6,712,475 | B2 | | 3/2004 | Davis et al. | |
| 2008/0138194 | A1 | * | 6/2008 | Wei et al. | ................. 415/121.2 |
| 2008/0310103 | A1 | * | 12/2008 | Della Fiora et al. | ......... 361/690 |

* cited by examiner

*Primary Examiner*—Georgia Y Epps
*Assistant Examiner*—Magda Cruz
(74) *Attorney, Agent, or Firm*—Andrew C. Cheng

(57) ABSTRACT

A projector includes a lamp, a fan for dissipating heat generated by the lamp, a housing, a number of blades received in the housing, and a elongated-slider. The housing receives the lamp and the fan, and includes a top cover, a sidewall connected to the top cover, and a bottom cover connected to the sidewall. The top cover defines an through opening therein. The blades can be rotated in cooperation with the slide of the elongated-slider in the through opening. As described above, the projector can exhaust thermal formed by the lamp or electronic elements from the air outlet. At the same time, the flow direction of the air from the air outlet can be changed in cooperation with the slider. Therefore, when a user sits by the air outlet, the user can adjust the flow direction of the air from the air outlet at any time.

8 Claims, 5 Drawing Sheets ures.
PROJECTOR

RELATED FILED

The present invention relates to a projector, and more particularly, to a projector have a ventilating structure.

BACKGROUND

Referring to FIG. 5, a conventional projector includes a housing 20 configured for receiving optical elements and electronic components of the projector therein. The housing case 20 includes a top cover 21, a sidewall 22 connected to the top cover 21, and a bottom cover 23 connected to the sidewall 22. The sidewall 22 includes an air outlet 221 to ventilate the projector for dissipating heat. Generally, a number of partition bars 222 are fixed, and airflow direction from the projector cannot be adjusted. As a result, hot air exhausted from the projector via the air outlet 221 may blow towards user near the air outlet 221.

It is desired to provide a projector having a ventilating structure which can overcome the above-described deficiencies.

SUMMARY

According to the present invention, a projector includes a lamp, a fan for dissipating heat generated by the lamp, a housing, a number of blades received in the housing, a elongated-slider. The housing receiving the lamp and the fan, and includes a top cover, a sidewall connected to the top cover, and a bottom cover connected to the sidewall. The sidewall defines an air outlet therein, the top cover defines an through opening therein, and the bottom cover defines a number of holes therein. The blades are disposed between the top cover and the bottom cover. Each of the blades includes a body, a first shaft extends from a bottom side of the body into the respective holes, and a second shaft extends a top side of the body into the opening. An axis of the first shaft is not alighted with that of the second shaft. The second shaft is slidable in the through opening and the first shaft is allowed to rotate in the respective holes along with the slide of the second shaft. The slider covers the open of the top cover and includes a number of guide slots configured for receiving the second shaft respectively. The elongated-slider actuates the second shaft to slide on the through opening.

Other novel features and advantages will become more apparent from the following detailed description when taken in conjunction with the accompanying drawings.

BRIEF DESCRIPTION OF THE DRAWINGS

The present invention is described in detail hereinafter, by way of example and description of preferred and exemplary embodiments thereof and with reference to the accompanying drawings, in which.

DETAILED DESCRIPTION OF THE PREFERRED EMBODIMENTS

A detailed explanation of a projector according to each of various embodiments of the present invention will now be made with reference to the drawings attached hereto.

Figure 1:
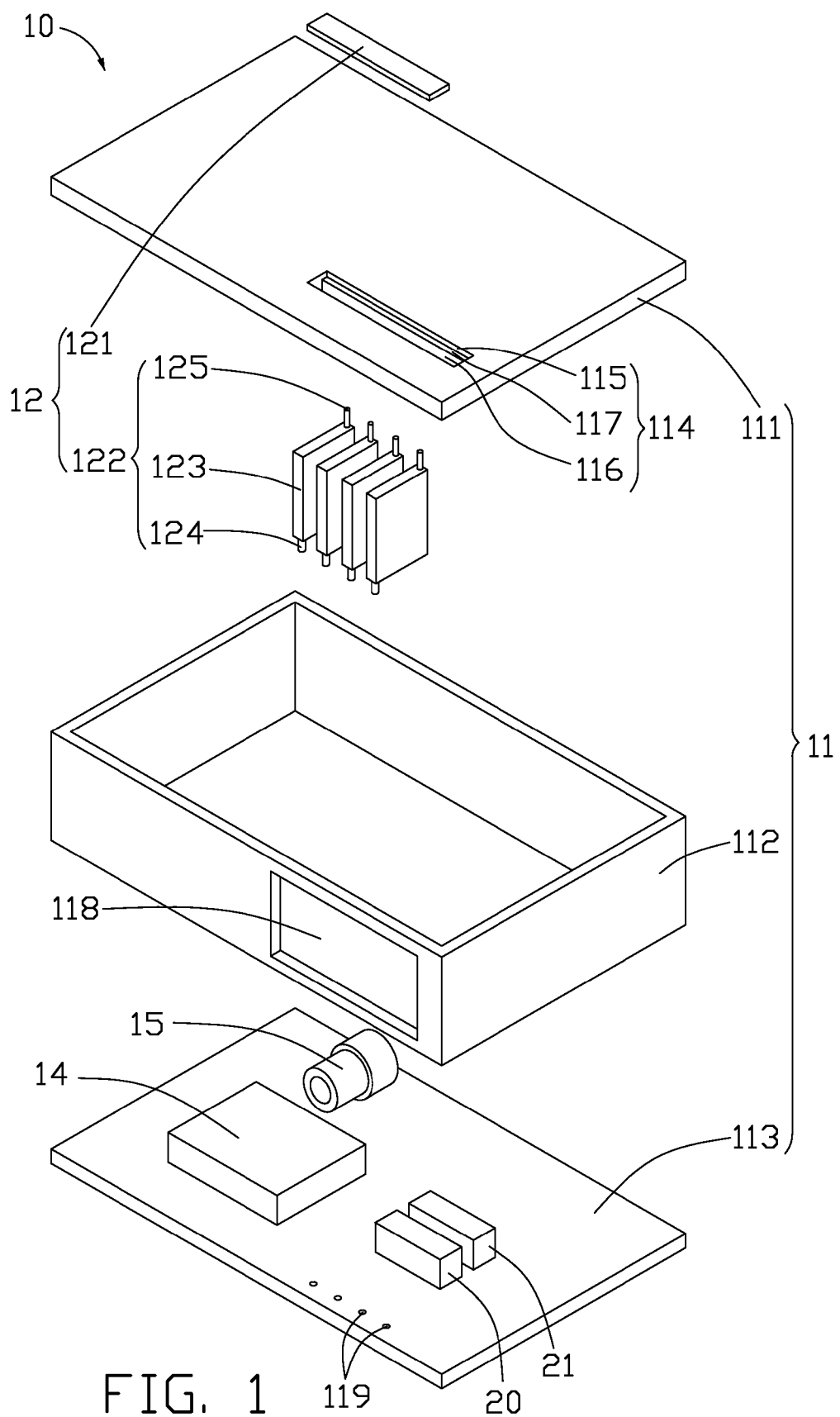
FIG. 1 is an exploded, isometric view of a projector in accordance with the present embodiment.
Figure 2:
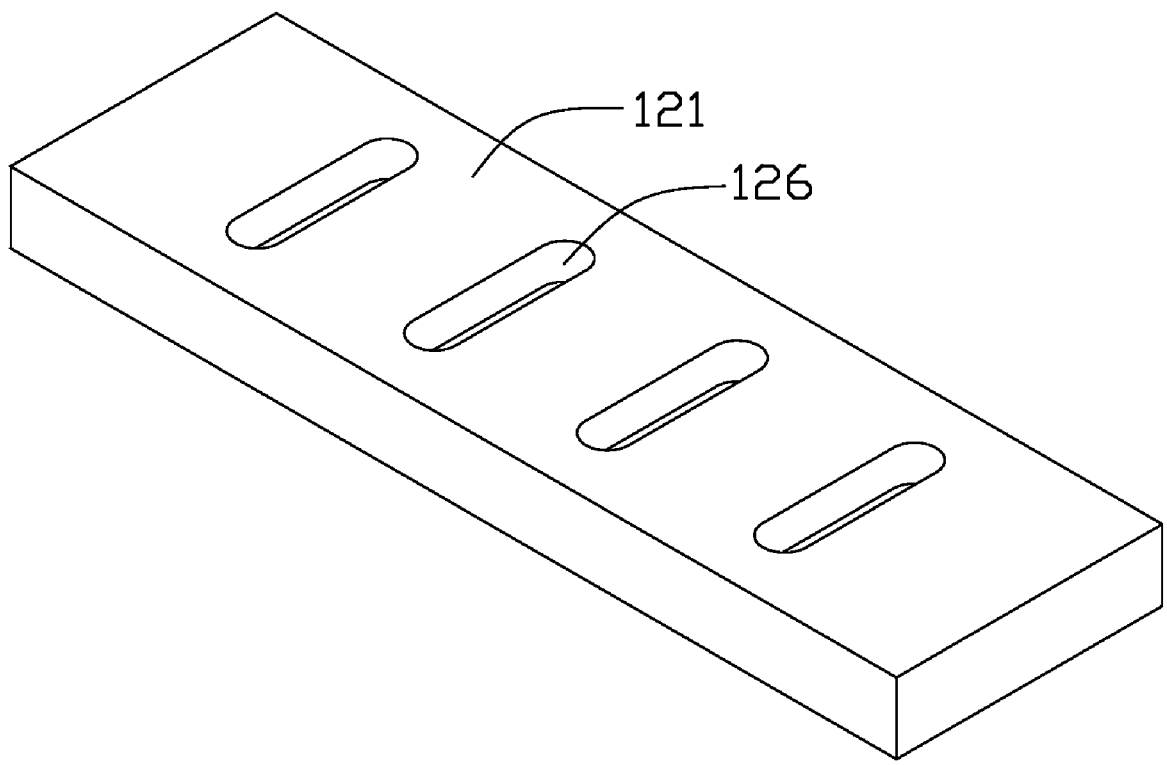
FIG. 2 is an isometric view of an elongated-slider of the projector for showing a number of slots of the elongated-slider.
Figure 3:
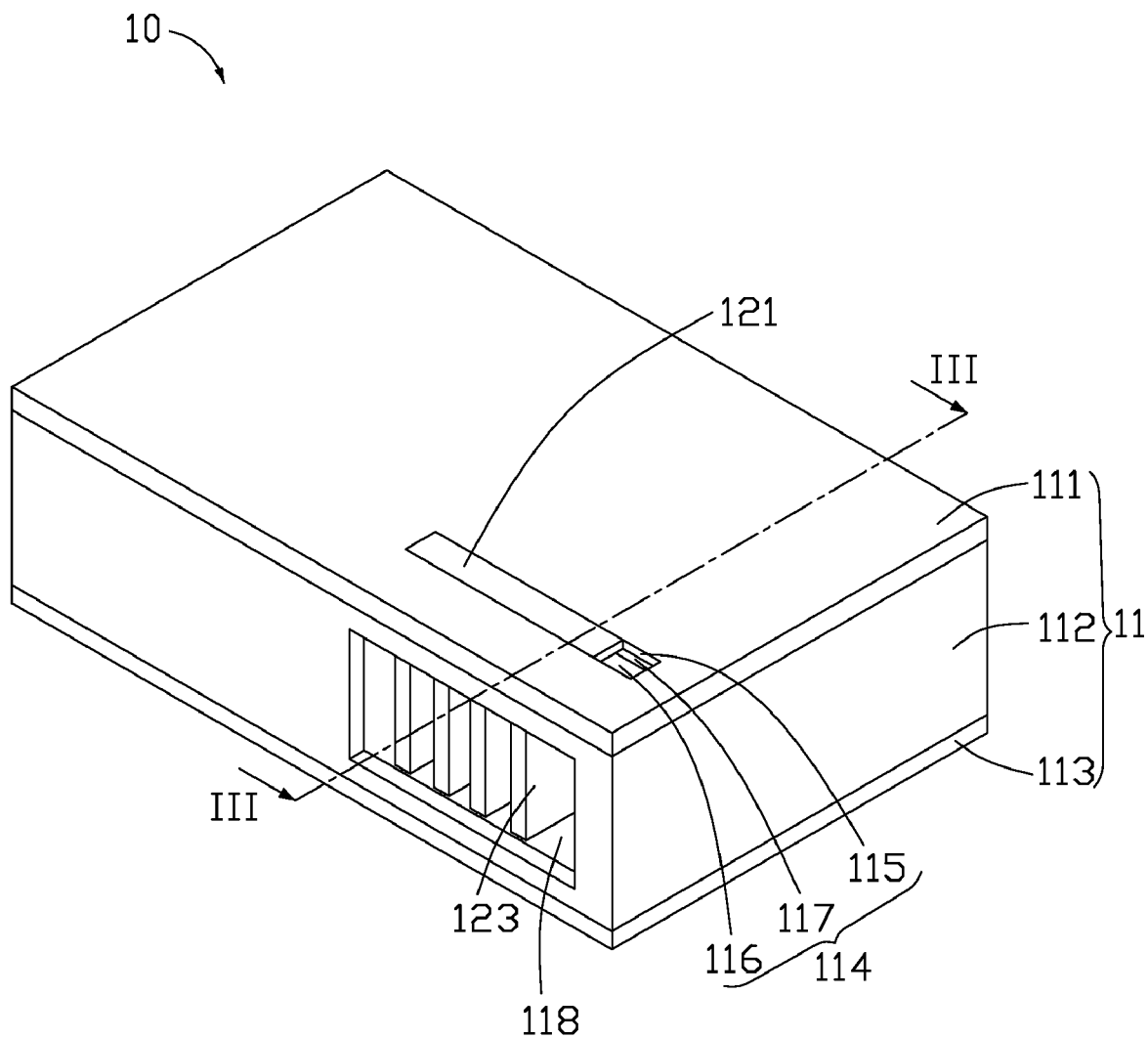
FIG. 3 is an assembled, isometric view of FIG. 1.
Figure 4:
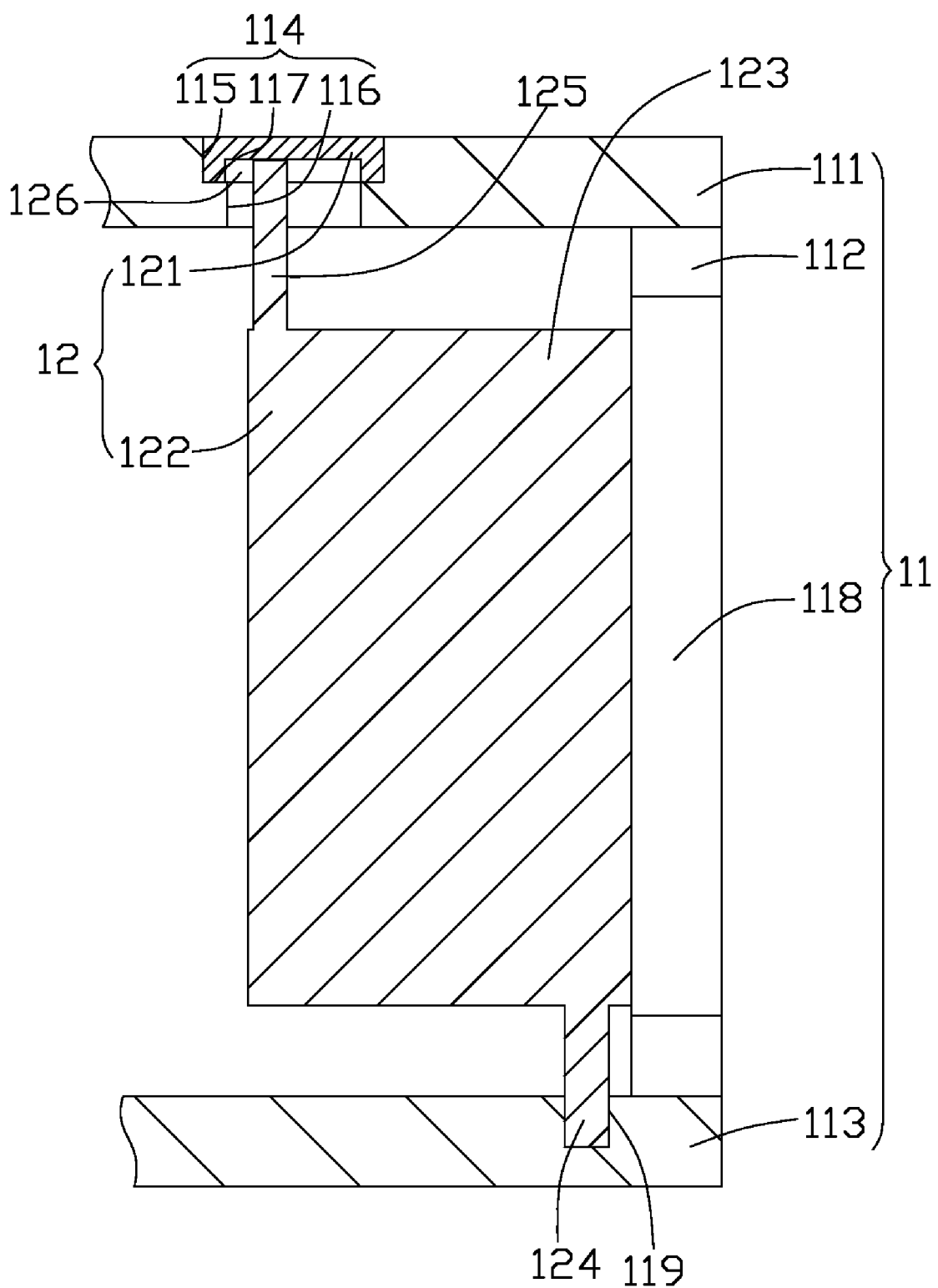
FIG. 4 is a cross-sectional view of the projector of FIG. 3 taken along line III-III.
Figure 5:
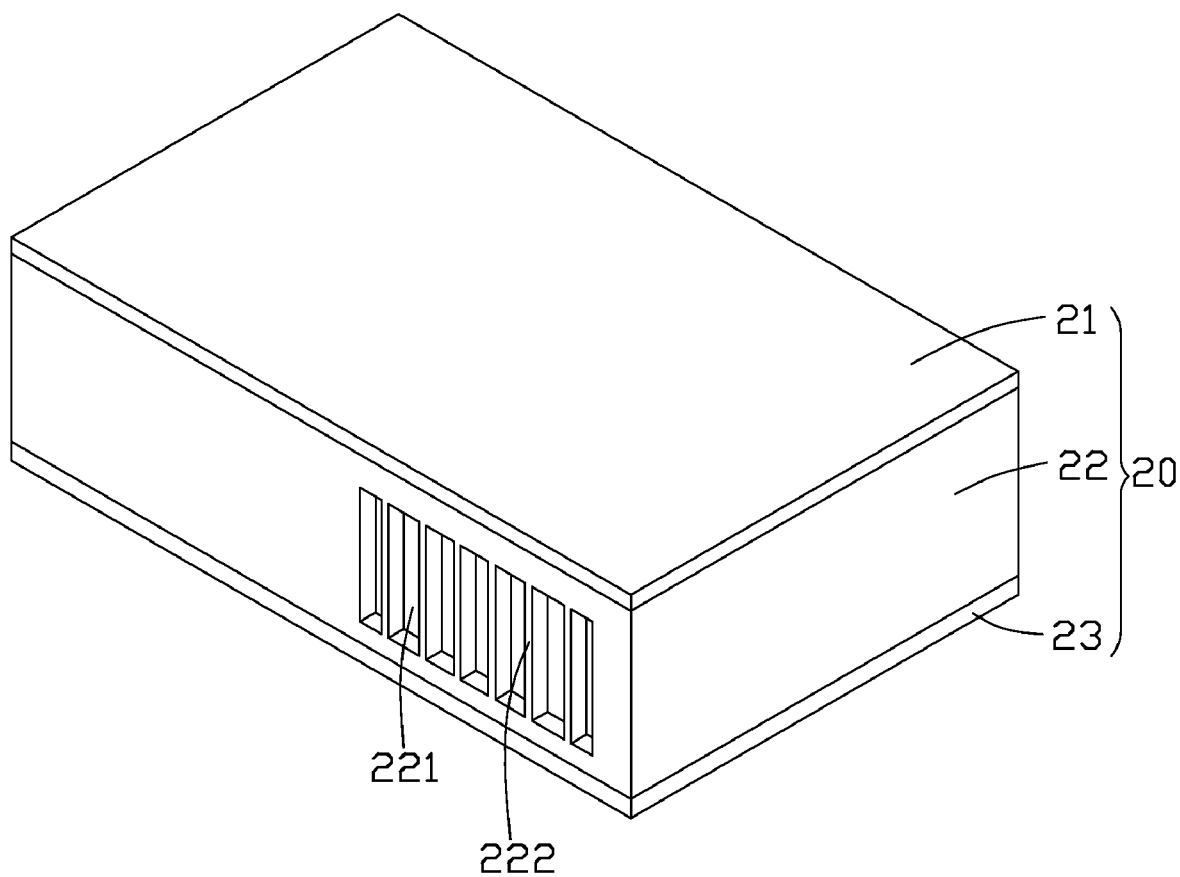
FIG. 5 is an isometric view of an air outlet of a sidewall of a conventional projector.

Referring to FIGS. 1-4, a projector 10 according to the present embodiment is shown. The projector 10 can be one of a liquid crystal display (LCD) projector, a digital light processing (DLP) projector and a liquid crystal on silicon (LCOS) projector. In the present embodiment, the projector 10 is a DLP projector presented only as an example to explain configurations and working principles of the projector 10. The projector 10 includes a lamp 20, a fan 21 for dissipating heat generated by the lamp 20, a housing 11, four blades 122 received in the housing 11, a elongated-slider 121, an image engine 14, and a projecting lens 15.

The lamp 20 can be is configured for providing light beams for the projector and can be a halogen lamp, a metal halogen lamp, a light emitting diode (LED), and the like. In the present embodiment, the light source 111 is a halogen lamp. It should be noted that a quantity of heat is generated by the lamp 20 during the lamp 20 works. The fan 21 faces toward the lamp 20 for increasing dissipation of the heat generated by the lamp 20. The lamp 20 and the fan is fixed on the housing 11 by any conventional methods, such as screws, welding, and the like.

The housing 11 includes a top cover 111, a sidewall 112 connected to the top cover 111, and a bottom cover 113 connected to the sidewall 112. The sidewall 112 includes an air outlet 118. Hot air from the lamp 20 and the fan 21 flows out of the air outlet 118. The top cover 111 includes an elongated through opening 114 near the air outlet 118 therein. The through opening 114 can be a round opening or a countersink. In the present embodiment, the through opening 114 is a countersink and includes an enlarged portion 115, and a narrow portion 116 connected to the enlarged portion 115, and a platform 117 formed between the enlarged portion 115 and the narrow portion 116. In particular, the enlarged portion 115 is coaxially connected to the narrow portion 116. Width of the platform 117 is determined by a difference between the inner diameters of the enlarged portion 115 and the narrow portion 116. The bottom cover 113 includes a plurality of holes 119 corresponding to the second aperture 116 of the through opening 114. The holes 119 can be through holes or blind holes. In the present embodiment, for aesthetic reasons, the holes 119 are a blind hole.

Each of The blades 122 includes a body 123, a first shaft/pivot 124 extending from a bottom side of the body 123, and a second shaft/pivot 125 extending from an opposite side of the body 123 which the first shaft/pivot 124 is disposed. A shape of the body 123 can be circular, rectangular, or the like. However, regardless of shape of the body 123, the axis of the first and second shafts 124, 125 are spaced from each other and parallel. In the present embodiment, the body 123 is a rectangular, and the first and second shafts 124, 125 are respectively disposed on two diagonally opposite corners of the body 123. The first shaft 124 is inserted in one of the holes 119 of the bottom cover 113. A diameter of the second shaft 125 is less than a width of the narrow portion 116 of the through opening 114 to allow the second shaft to slide in the narrow portion 116. The width of the elongated-slider 121 is substantially equal to that of the enlarged portion 115 so that the elongated-slider 121 can be received in the enlarged portion 115 and is positioned at the platform 117. A length of the elongated-slider 121 is less than that of the first aperture 115 so that the elongated-slider 121 can slide in the enlarged portion 115. It can be understood that when the through opening 114 can be a round opening, the elongated-slider 121 can directly cover the through opening 114.

The elongated-slider 121 includes a plurality of guide slots 126 configured for receiving the second shafts 125. A length of the guide slots 126 along the sliding direction of the second shafts 125 is greater than the diameter of the second shafts 125 so that the second shafts 125 can slide along the respective guide slots 126. When the elongated-slider 121 slides along the first aperture 116, the body 123 of the blade 122 can rotate round the first shafts 124. Thus, the flow direction of the air from the air outlet 119 can be changed. It can be understood that the increase of the length of slide slots 126 along the slide direction of the second shafts 125 can increase the rotation angle of the blades 122 as the rotation angle of the blades 122 is determined by the length of the slide slots 126.

The image engine 14 is positioned to receive light output from the lamp 20 and is configured for superimposing spatial information on the light to form image. In the DLP projector, a digital micro-mirror device (not shown) is employ to superimpose spatial information.

The projecting lens 15 is configured for receiving the light output of the image engine 14 and magnifying and projecting an image formed by the light emitted from the image engine 14 on a screen (not shown).

As described above, the projector can disperse heat formed by the lamp 20 from the air outlet 118. At the same time, the flow direction of the air from the air outlet 118 can be changed in cooperation with the elongated-slider 121 of the ventilating structure 12. Therefore, when a user sits by the air outlet 118, the user can adjust the flow direction of the air from the air outlet 118 at any time.

It should be understood that the above-described embodiment are intended to illustrate rather than limit the invention. Variations may be made to the embodiments without departing from the spirit of the invention. Accordingly, it is appropriate that the appended claims be construed broadly and in a manner consistent with the scope of the invention.

What is claimed is:

1. A projector, comprising:
   a lamp;
   a fan for dissipating heat generated by the lamp;
   a housing receiving the lamp and the fan therein, the housing comprising a top cover, a sidewall connected to the top cover, and a bottom cover connected to the sidewall, the sidewall defining an air outlet therein, the fan facing toward the air outlet, the top cover defining an elongated through opening therein, and the bottom cover defining a plurality of holes therein;
   a plurality of blades disposed between the top cover and the bottom cover, each of the blades comprising a body arranged at the air outlet, a first shaft extending from a bottom side of the body and rotatably engaged in the respectively holes in the bottom cover, and a second shaft extending from a top side of the body into the through opening, an axis of the first shaft being spaced form and parallel with that of the second shaft; and
   an elongated-slider covering the through opening of the top cover and defining a plurality of guide slots for engagingly receiving the respective second shafts therein.

2. The projector as claimed in claim 1, wherein the through opening comprising an enlarged portion and a narrow portion connected to the enlarged portion, a width of the enlarged portion is greater than that of the narrow portion, and a width of the enlarged portion is greater than the diameter of the second shaft.

3. The projector as claimed in claim 2, wherein a lengthwise direction of each of the guide slots is substantially perpendicular to a lengthwise direction of the slider.

4. The projector as claimed in claim 2, wherein the slider is slidably received in the enlarged portion.

5. The projector as claimed in claim 2, wherein an area of the slider is substantially equal to that of the enlarged portion of the through opening.

6. The projector as claimed in claim 2, wherein a thickness of the elongated-slider is substantially equal an axis length of the enlarged portion.

7. The projector as claimed in claim 1, wherein a shape of each body of the blades is rectangular, the first, second shafts are disposed in two diagonal corners of the body.

8. A projector comprising:
   a lamp;
   a fan for blowing air to dissipate heat generated by the lamp;
   a housing receiving the lamp and the fan therein, the housing comprising a top cover, a sidewall connected to the top cover, a bottom cover connected to the sidewall, and an air outlet, the fan facing toward the air outlet, the top cover defining an elongated through opening therein, and the bottom cover defining a plurality of holes therein;
   a plurality of blades disposed between the top cover and the bottom cover proximate to the air outlet, each of the blades comprising a blade body, a first shaft extending from the underside of the blade body and rotatably engaged in the respective hole in the bottom cover, and a second shaft extending from a topside of the blade body, an axis of the first being spaced from and parallel to that of the second shaft; and
   an elongated slider mounted in the through opening of the top cover, the slider defining a plurality of guide slots engagingly receiving the respective second shafts therein, a lengthwise direction of each of the guide slots being substantially perpendicular to a lengthwise direction of the slider.

* * * * *